United States Patent [19]

Umemoto et al.

[11] Patent Number: 4,764,569
[45] Date of Patent: Aug. 16, 1988

[54] COATING COMPOSITION HAVING IMPROVED WEATHERING RESISTANCE AND RECOATING PROPERTY RESINOUS COMPOSITION TO BE USED THEREIN

[75] Inventors: Hirotoshi Umemoto; Hisaki Tanabe, both of Kyoto; Yutaka Takeuchi, Kanagawa, all of Japan

[73] Assignee: Nippon Paint Co., Ltd., Osaka, Japan

[21] Appl. No.: 945,163

[22] Filed: Dec. 24, 1986

Related U.S. Application Data

[63] Continuation of Ser. No. 671,077, Nov. 13, 1984, abandoned.

[30] Foreign Application Priority Data

Nov. 12, 1983 [JP] Japan ................................ 58-212799
Nov. 12, 1983 [JP] Japan ................................ 58-212800
Nov. 19, 1983 [JP] Japan ................................ 58-218126

[51] Int. Cl.⁴ ............................................. C08G 63/46
[52] U.S. Cl. .................................... 525/446; 525/100; 525/342; 525/375; 525/447; 528/26; 528/27
[58] Field of Search ............... 525/342, 375, 100, 446, 525/447; 528/26, 27

[56] References Cited

U.S. PATENT DOCUMENTS

| | | | |
|---|---|---|---|
| 3,159,600 | 12/1964 | Watkins | 528/27 |
| 3,290,417 | 12/1966 | Christenson et al. | 525/100 |
| 4,018,849 | 4/1977 | Chang et al. | 525/453 |
| 4,093,673 | 6/1978 | Chang et al. | 525/100 |
| 4,320,172 | 3/1982 | Takamizawa et al. | 525/100 |
| 4,368,294 | 1/1983 | Deubzer et al. | 525/446 |

FOREIGN PATENT DOCUMENTS 0157425  12/1975  Japan ................................. 525/100

Primary Examiner—Wilbert J. Briggs, Sr.
Attorney, Agent, or Firm—Wenderoth, Lind & Ponack

[57] ABSTRACT

A resinous composition for coating use which is obtained by the reaction of base resin having both hydroxyl and carboxyl groups with an organopolysiloxane resin and with an alkylene imine compound in any successive order. The invention also provides a coating composition containing as resinous vehicle the abovesaid silicon and alkylene imine modified resin or a combination of silicon modified resin and polyalkylen imine. The present coating composition is characterized by having excellent recoatability and weathering resistance.

4 Claims, No Drawings

COATING COMPOSITION HAVING IMPROVED WEATHERING RESISTANCE AND RECOATING PROPERTY RESINOUS COMPOSITION TO BE USED THEREIN

This application is a continuation of application Ser. No. 671,077, filed Nov. 13, 1984, now abandoned.

FIELD OF INVENTION

The present invention relates to a coating composition for top-coat use having improved weathering resistance and recoating properties and resinous composition to be used in said coating composition.

BACKGROUND OF THE INVENTION

A coating composition containing as essential components a binder composition comprising a hydroxyl bearing heat curable resin and an aminoaldehyde resin and/or isocyanate compound, and a pigment has been widely used in various fields because of its capability of giving a cross-linked tough coating through baking. However, depending on the kind of base resin used, the coating performance, the application characteristics, the appearance and the like are divided in every case, and with the diversification in needs, further improvements in film performance and especially weathering resistance have been longed for.

As the resinous binder for coating compositions, a combination of oil-free polyester and aminoaldehyde resins has been well known and watched with keen interest because they have improved properties such as weathering resistance, improved mechanical properties when used as a coating, improved interlaminar adhesion and the like. However, since there is a trend of these coatings of to easily generate craters and to lose their gloss unevenly and since a polyester has relatively poor compatibility with amino resins, such combination has not been used to widely. Recently, many important facts have been found out such that by the use of saturated alicyclic polybasic acids or the combination of saturated alieyclic polybasic acids and aromatic polybasic acids as a part of the acid component of the oil-free polyester resin, considerable improvements in application characteristics, uneven such as, compatibility with amino resins and improved gloss and curing properties can be attained, and that by the modification of the polyester resin with a reactive organopolysiloxane resin the, weathering resistance can be improved, and that by reacting the polyester resin with a saturated alicyclic polybasic acid and then subjecting it to a silicon modification, further improvements in application characteristics (pinhole, sagging and cratering resistances), gloss and weathering resistance can be obtained, and on the basis of these findings, polyester based coating compositions have suddenly become the object of public attention as top-coats for automobile coil coatings and the like. However, when a polyester resin is subjected to a silicon modification, an improvement in weathering resistance is indeed realized but an additional problem of decreased recoatability occurs. Therefore, in order to make a polyester base composition which is widely useful as a top-coat, it is essential that the recoatability as well as the weathering resistance thereof be improved. Various proposals heretofore made have given enough answers to the above problems.

The inventors, with the object of improving both the recoatability and the weathering resistance of a polyester resin based composition, have endeavored and found that an improvement in the weathering resistance of a polyester composition is most advantageously achieved by the abovesaid silicon modification and the loss of recoatability in such composition can be effectively cured by the introduction of particular alkylene imine moieties thereto, and that such means can successfully be applied to other resins than polyesters, as well. As the basis of these findings, the invention has been made.

SUMMARY OF THE INVENTION

According to the invention, there is provided a resinous composition for coating use, which is obtained by reacting a base resin bearing both hydroxyl and carboxyl groups with an organopolysiloxane resin of the formula:

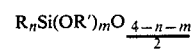

wherein R is monovalent organic group attached to Si through C—$S_i$ bonding; R' is hydrogen, $C_1$ to $C_{20}$ alkyl or aryl groups; n and m each represents a real number of 4 and less, providing $n+m \leq 4$, and having a number average molecular weight of about 500 to 2000, and with an alkylene imine compound having at least one $C_2$ to $C_3$ alkylene imine rings, in any successive order.

The invention also provides a coating composition comprising (A) a hydroxyl bearing thermosetting resin, (B) an aminoaldehyde resin and/or isocyanate compound and (C) a pigment, which is characterized by that said (A) resin is obtained by reacting a base resin having both hydroxyl and carboxyl groups with an organopolysiloxane resin having a number average molecular weight of about 500 to 2000 and being represented by the formula:

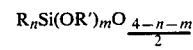

wherein R is mono-valent organic group attached to Si through a C—Si bonding; R' is hydrogen, $C_1$ to $C_{20}$ alkyl or an aryl group; and n and m each represents a real number of 4 and less, providing $n+m \leq 4$, and with an alkylene imine compound having at least one $C_2$ to $C_3$ alkyleneimine rings.

The invention further provides a coating composition comprising (D) a silicon-modified resin and (E) a polyethylene imine of the formula:

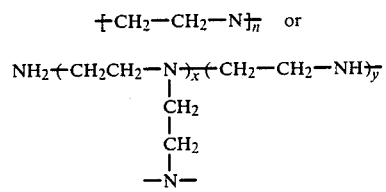

wherein R is hydrogen or a substituted or unsubstituted $C_1$ to $C_{20}$ alkyl or aryl group, n is an integer of 3 to 2000, x is 0 to 1000 and y is 3 to 2000, the weight ratio of (A)/(B) being 95 to 99.99/5 to 0.01.

PREFERRED EMBODIMENTS OF THE INVENTION

In the first invention, a base resin bearing both hydroxyl and carboxyl groups is reacted, in any successive order, with an organopolysiloxane resin and an alkylene imine compound. As the base resin, any of the resins having both hydroxyl and carboxyl groups may be satisfactorily used. Examples of such resins are polyester resins, alkyd resins, acrylic resins and the like customarily used as resinous vehicles in coating compositions. The inventors have first found that when hydroxyl groups of such resins are reacted with reactive organopolysiloxane resins, thereby effecting silicon modification of the resins, the weathering resistance is markedly improved. As the reactive organopolysiloxan resins to be used, mention is made of such members as stated in Japanes Patent Application Kokai Nos. 157461/81 and 157462/81, and represented by the formula:

$$R_n Si(OR')_m O_{\frac{4-n-m}{2}}$$

wherein R is mono-valent organic group attached to Si through C—Si bonding, R' is hydrogen, $C_1$ to $C_{20}$ alkyl or aryl groups; and n and m each represents a real number of 4 and less, providing that n+m is less than 4, and having a number average molecular weight of about 500 to 2000.

Such organopolysiloxane resin should preferably have 2 and more reactive groups OR' (as hydroxy and alkoxy), which are caused to react with hydroxyl groups of the base resin through dehydration and dealcoholization, thereby effecting the silicon modification of the base resin.

Examples of such silicon resins are
Z-6018 (Dow Corning Co.,

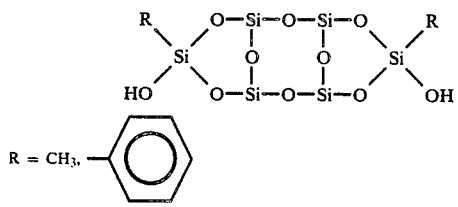

R = $CH_3$, 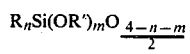

Molecular weight 1600),
Z-6188 (Dow Corning Co.,

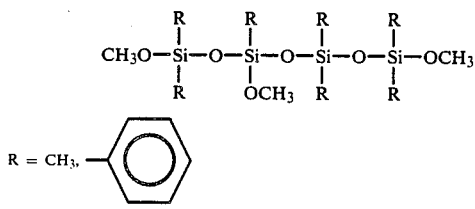

R = $CH_3$, 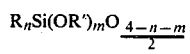

Molecular weight 650),
Sylkyd 50, DC-3037 (Dow Corning Co.),
KR-216, KR-218, KSP-1 (Shinetsu Silicon Co.),
TSR 160, TSR-165 (Tokyo Shibaura Elect. Co.),
SH-5050, SH-6018, SH-6188 (TOray Silicon Co.) and the like.

For the silicon modification of these base resin, it is in general preferred to react 20 to 97 parts by weight of a base resin with 80 to 3 parts by weight of a reactive organopolysiloxane resin (all in solid weight).

This is because, the desired improvement in weathering resistance cannot be expected with a lesser amounts, i.e., less than 3 parts by weight, of an organopolysiloxane resin and at higher levels more than 80 parts by weight, there is a trend for the compatibility of base resin with organopolysiloxane resin to decrease and hence they are hardly reacted with each other.

The inventors have further found that the loss of recoatability accompanied with the silicon modification of such base resin may be effectively recovered by modification with an alkylenimine compound.

As already stated, the present base resin bears carboxyl groups and therefore, when reacted with a compound having at least one $C_2$ to $C_3$ alkyleneimine ring, the said ring is first opened and reacted with said carboxyl groups, thereby attaining the alkyleneimine modification of the base resin.

The alkylenimine compounds employed in the present invention may include the following:

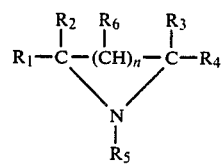

wherein $R_1$, $R_2$, $R_3$, $R_4$ and $R_5$ each represents hydrogen; an alkyl group having 20 and less carbon atoms such as methyl, ethyl, propyl and the like; aryl like phenyl; an alkaryl such as tolyl, xylyl and the like; aralkyl as benzyl, phenethyl and the like; and $R_6$ represents hydrogen or an alkyl generally having less than 6 carbon atoms; and n is 0 or 1.

The above mentioned groups each may further include substituents which will produce no harmful effects on the fundamental properties of the imine group. Examples of such substituents are carbonyl, cyano, halogen, amino, hydroxyl, alkoxy, carbalkoxy and nitrile. Typical examples of said alkylene imine compounds are ethylene imine, 1,2-propylene imine, 1,3-propylene imine, 1,2-dodecylene imine, 1,1-dimethyl ethylene imine, phenyl ethylene imine, tolyl ethylene imine, benzyl ethylene imine, 1,2-diphenyl ethylene imine, 2-hydroxyethyl ethylene imine, aminoethyl ethylene imine, 2-methyl propylene imine, 3-chloropropyl ethylene imine, p-chlorophenyl ethylene imine, methoxyethyl ethylene imine, carboethoxyethyl ethylene imine, N-ethyl ethylene imine, N-butyl ethylene imine, N-(2-aminoethyl)ethylene imine, N-(2-hydroxyethyl)ethylene imine, N-(cyanoethyl)ethylene imine, N-phenyl ethylene imine, N-triethyl ethylene imine, N-(p-chlorophenyl)ethylene imine, N-(2-carboethoxy-1-ethyl)ethylene imine.

From the standpoint of availability and effectiveness, particularly preferable members are ethylene imine, 1,2-propylene imine and N-(2-hydroxyethyl)ethylene imine.

In the present invention, alkylene imines other than those of the abovementioned general formula may be satisfactorily used, providing they have at least one $C_2$ to $C_3$ alkylene imine ring. Examples are ethylene-1,2-bisazirdine and 1,2,4-tris(2-1-aziridinyl ethyl)trimellitate and the like.

The above-mentioned alkylene imine compound must be reacted with the base resin in an amount corresponding to a resinous acid value of 0.1 to 50. In other words, it is essential that the alkylene imine compound be reacted with the base resin in an amount of $2 \times 10^{-4}$M to $1 \times 10^{-1}$M Wt% of the resin, wherein

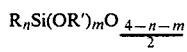

$$M = \frac{\text{molecular weight of alkylene imine}}{\substack{\text{number of alkylene imine groups} \\ \text{contained in a molecule} \\ \text{of the alkylene imine compound}}}$$

This is because, if the amount of alkylene imine compound is less than the abovesaid lower limit, then the effect of said modification cannot be fully attained, whereas if the said amount exceeds the abovementioned upper limit, there is a considerable lowering in film performance due to the severe yellowing of the coating and when compounded with a cross-linking agent, there often occurs a deficiency in the curing properties. Either of the abovesaid silicon modification and alkylene imine modification may be easily carried out by merely heating the mixture of starting resin and reagent, in the presence or absence of solvent, at a temperature of less than 200° C., preferably less than 150° C.

In a particularly preferable embodiment of the invention, the base resin is first subjected to a silicon modification and then to an alkylene imine modification. However, it is possible to effect the alkylene imine modification in the first step and the silicon modification in the subsequent step, and if desired, these two may be effected simultaneously.

Though the invention is applicable to any base resins providing having both hydroxyl and carboxyl groups, a particularly advantageous application is for the modification of a polyester resin and inter alia, such polyester resin which has a saturated alicyclic polybasic acid in an amount of at least 25%, preferably at least 40% of the total acid components. By the adoption of such conditions, particularly excellent weathering resistance and recoating properties are obtained, as well as improved application characteristics, appearance and other film performance required for a top-coat paint composition. Therefore, in the second aspect of the present invention, a coating composition based on the abovesaid modified resin composition is provided.

That is, in the present invention, there is provided a coating composition having improved weathering resistance and recoatability and consisting essentially of (A) a hydroxyl bearing thermosetting resin,
(B) an aminoaldehyde resin and/or isocyanate compound, and
(C) a pigment, characterizing by using as (A) a resin, obtained by subjecting a base resin having both hydroxyl and carboxyl groups to a silicon modification with an organopolysiloxane resin represented by the formula:

$$R_n Si(OR')_m O_{\frac{4-n-m}{2}}$$

(wherein R is monovalent organic group attached to Si through C—Si bonding; R' is hydrogen, $C_1$ to $C_{20}$ alkyl or aryl group; and n and m each represents a real number of 4 and less, providing satisfying the condition $n+m \leq 4$) and having a number average molecular weight of about 500 to 2000, and to an alkylene imine modification with an alkylene imine compound having at least one $C_2$ to $C_3$ alkylene imine ring. As already stated, the abovesaid silicon and alkylene imine modifications may be carried out with the base resin in any desired order.

The component (B) is a cross-linking agent selected from an amino aldehyde resin and/or an isocyanate compound.

As the amino aldehyde resin, mention is made of such resins which contain melamine, urea, benzoguanamine, acetoguanamine, steroguanamine, and spiroguanamine as an amino component.

Any of the aminoaldehyde resins commonly used in coating compositions may be successfully used in the present invention. Among them, the most preferable one is a melamine formaldehyde resin from the standpoint of weathering resistance.

To these aminoaldehyde resins, it may be possible to add conventional curing catalysts for lowering the curing temperature. Examples of isocyanate compounds are polyisocyanates as tolylenediisocyanate, hexamethylene diisocyanate, isophorone diisocyanate, methylene bis(4-cyclohexyl isocyanate) and the like, and blocked type polyisocyanates as the abovesaid polyisocyanates blocked with aliphatic or aromatic monoalcohol, phenol, oxim, caprolactam and other conventional blocking agent. Typical examples of said blocked type polyisocyanates are Takenate B-815N, Takenate B-840N (Takeda Yakuhin K.K.); Adduct B 1065 (Veba Chemie, West Germany); Additol VXL-80 (Hoechst Japan) or the like.

When blocked type polyisocyanates are selected one may use catalyst capable of accelerating the release of the blocking agent therefrom.

The abovesaid aminoaldehyde resins and polyisocyanates may be used singularly or in combination form.

In the present invention, the solid weight ratio of said silicon and alkylene imine modified resin (A) to aminoaldehyde resin and/or polyisocyanate (B) should be in a range of 90/10 to 60/40. This is because, if the amount of said cross-linking agent (B) is far below the abovesaid lower limit, these shows a tendency to lower the weathering resistance, the coating hardness and the solvent resistance due to deficient curing, whereas if it is in far excess of the abovesaid upper limit, the coating will become too brittle.

As the pigment, any of the organic and inorganic pigments customarily used in coating compositions may satisfactorily be employed in an amount of less than 100 PHR. If the pigment concentration is higher than 100 PHR, there is an effect on the weathering resistance. The present coating composition can be prepared by using the aforesaid binder and pigment components.

If desired, the composition may be added with other conventional coating additives as surface conditioners, UV absorbers, antisettle agents, antioxidants, wetting agents, dilutents and the like.

No particular device is required for applying the composition and the usual application methods such as brushing, spraying, dipping and the like may be satisfactorily used.

The inventors have further found that the abovesaid improvements in weathering resistance and recoatability may be likewise obtained with the mere mixture of a silicon modified resin and a particular polyethylene imine. Thus, in the third present aspect of this invention, there is provided a coating composition consisting essentially of (A) a silicon modified resin, and
(B) a polyethylene imine represented by the formula:

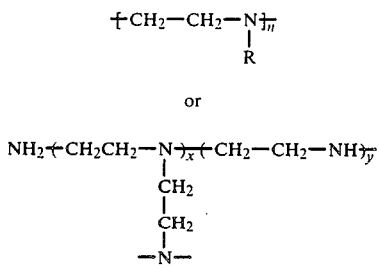

wherein R is hydrogen a, substituted or unsubstituted $C_1$ to $C_{20}$ alkyl or an aryl group, n is an integer of 3 to 2000, x is 0 to 1000, and y is 3 to 2000, the weight ratio of (A)/(B) being 95 to 99.99/5 to 0.01.

As the silicon modified resins, mention is made of silicon modified polyester resins, silicon modified alkyd resins, silicon modified acrylic resins as disclosed in Japanese Patent Application Kokai Nos. 21493/72, 157461/81, 157462/81 and the like.

Usually, such resins may be prepared by mixing a base resin, such as a polyester, an alkyd and an acrylic resin, with a reactive organopolysiloxane resin of the formula:

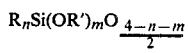

in which R, R', n and m are as defined above, and heating the mixture.

Since the silicon modified resins are the same materials used in the first embodiment as an intermediate for the preparation of silicon and alkylene imine modified resins, no additional explanations should be required.

The polyethylene imines used in this third embodiment are represented by the formula:

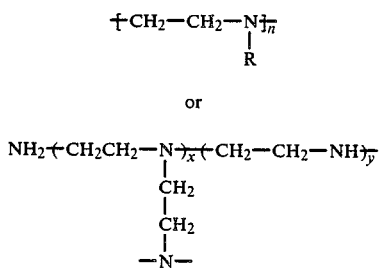

They are easily available in the market or prepared by the methods known per se., if desired.

Examples of such resins are Epomin SP-003, SP-006, SP-012, SP-018, SP-103, SP-110 (manufactured by Nihon Shokubai Kagaku Kogyo K.K., molecular weight 250 to 1800), Epomin SP-200, SP-300 (manufactured by Nihon Shokubai Kagaku Kogyo K.K., molecular weight 10000, 30000), Epomin P-1000, P-1020 (manufactured by Nihon Shokubai Kagaku Kogyo K.K., molecular weight 70000, 10000), Polyethylenimine 210T (manufactured by Sogo Yakkoh, viscosity 19000 to 23000 cps, 50% aqueous solution), Polyethylenimine 15T (manufactured by Sogo Yakkoh, viscosity 1000 to 2000 cps) and like.

Particularly preferable members are Polyethylenimine 210T and Polyethyleneimine 15T.

Such polyethylene imine is usually used in an amount of 5 to 0.01 parts by weight (solid basis) to 95 to 99.99 parts by weight of the silicon modified resin.

If the amount of polyethylene imine is too small, one cannot expect good recoatability and if it is too excessive, the weathering resistance, chemical resistance, water resistance and the like is decreased. For the preparation of a coating composition, it is only required to combine the silicon modified resin and polyethylene imine in the defined weight ratio and mix well at a room temperature.

In this invention, a cross-linking agent such as a melamine formaldehyde resin and a polyisocyanate is optional. If desired, the composition may include pigments, surface conditioners, UV absorbers, antioxidants, wetting agents and other conventional additives.

The present coating compositions are useful as both an inter coat and a topcoat. The invention shall be now more fully explained in the following Examples. Unless otherwise being stated, all parts and percentages are by weight.

EXAMPLE 1

Into a reaction vessel fitted with a heater, stirrer, reflux condenser, water separator, a fractionating column and a thermometer, were placed 19.4 parts of hexahydro phthalic anhydride, 22.6 parts of trimethylol propane, 26.5 parts of neopentylglycol and 30.1 parts of 1,6-hexanediol and the mixture was heated. When the charged materials were melted and brought to the condition capable of being stirred, stirring was commenced and the temperature raised to 210° C. From 210° C. to 230° C., said temperature increases at a constant speed in 2 hours and the formed water was removed out of the system during said heating. When the temperature reached 230° C., the mixture was maintained at the same temperature until the resinous acid value of 1.0 was allowed and then allowed to cool.

After cooling, 83.1 parts of isophthalic acid were added and again heated to 190° C. The temperature was then raised from 190° C. to 210° C., at a constant rate over a 3 hours period, during which time the formed in the reaction water was continuously removed out of the system. When the temperature reached 210° C., 3.2 parts of xylene was added and the reaction was switched to a condensation reaction in the presence of solvent. When the resinous acid value reached 20.0, the mixture was allowed to cool and 29.3 parts of xylene and 75.9 parts of Cellosolve acetate were added to obtain an oil-free polyester resinous varnish A (ahereinafter called as base resin A).

Next, 28.7 parts of a reactive silicon resin DC-3037 (Dow Corning Co.) and 0.38 part of TBT-100 (tetrabutyl tianate, condensation catalyst. manufactured by Nihon Soda K.K.) were added and the mixture was heated and stirred. The reaction was continued at 140° C. until the methanol, formed and recovered, reached 75% of the theoretical amount (which is the amount of methanol calculated when 100% of the methoxy groups in the reactive silicon resin are reacted with the hydroxyl groups of the polyester resin), and then the mixture was allowed to cool. Finally, 0.9 part (corresponding to resinous acid value to be consumed by the reaction of 3.0) of N-(2-hydroxyethyl)ethyleneimine (HEEI, trade mark of Sogo Yakko K.K.) was added and the mixture was heated at 80° C. for 1 hour and then allowed to cool. After cooling, 5.8 parts of xylene and 13.6 pats of Cellosolve acetate were added to obtain an alkyleneimine modified silicon polyester resin varnish I. This varnish showed such characteristics that the non-volatile content is 60.5%; the varnish viscosity (Gardner's viscosity, 25° C.) was R-S; and resinous acid value was 15.0.

EXAMPLES 2 AND 3

Two batches of the same silicon modified polyester resin varnish as stated in Example 1 were prepared. To one of the batches, 1.8 parts (corresponding to a resinous acid value to be consumed by the reaction of 6.0) of HEEI and to the other batch, 3.0 parts (corresponding to resinous acid value to the consumed by the reaction of 10.0) of HEEI were added and reacted as in Example 1 to obtain an alkyleneimine modified silicon polyester resin varnish 2 and 3. The characteristics of these varnishes are shown in Table 1.

EXAMPLE 4

Following the prescription shown in Table 1 and using the same procedures as given in Example 1, a polyester resin (resinous acid value 60.0) was prepared (base resin B). This resin was subjected to a silicon modification and an alkyleneimine modification as in Example 1 to obtain a resinous varnish, whose characteristics are shown in Table 1.

EXAMPLE 5

Following the prescription shown in Table 1 and using a conventional method, coconut oil was subjected to an ester-exchange reaction and then a condensation reaction was carried out as in Example 1 until a resinous acid value of 20.0 was attained. The reaction mixture was allowed to cool to obtain a base resin C. The base resin was then subjected to silicon modification and alkyleimine modification as in Example 1 to obtain an alkylenimine modified silicon alkyd resin varnish 5. The characteristics of this varnish are shown in Table 1.

EXAMPLE 6

Using the base resin A and the reactive resin KR-213 (manufactured by Shinetsu Silicon K.K.), a silicon modification of the base resin was carried out as in Example 1. Next, ethylenimine (manufactured by Nihon Shyokubai Kagaku Kogyo) was reacted under the same conditions as stated in Example 1 to obtain an alkylenimine modified silicon polyester resin varnish 6, whose characteristics are shown in Table 1.

EXAMPLES 7 TO 9

According to the prescriptions shown in Table 1, the similar condensations were carried out as in Example 1 to resinous acid values of 20.0, 30.0 and 40.0, and then allowed to cool to obtain base resins D, E and F, respectively. To each of the base resins, reactive silicon resin DC-3037 was added so as to give a weight ratio of base resin/silicon resin (solid)=95/5, 55/45 and 40/60, and a silicon modification was carried out as in Example 1. Next, the alkylenimine modification was carried out as in Example 1 with the respective silicon modified base resins to obtain alkylenimine modified silicon polyester resin varnishes 7, 8 and 9, whose characteristics are shown in Table 1.

EXAMPLE 10

Into a reaction vessel, was placed 45 parts of xylene and 50 parts of Cellosolve acetate and the mixture was heated to 130° C. To this, a mixed solution of 15 parts of styrene (ST), 42.2 parts of n-butyl methacrylate (n-BMA), 16.6 parts of lauryl methacrylate (LMA), 23.2 parts of 2-hydroxyethyl methacrylate (2HEMA), 3.0 parts of methacrylic acid (MAA), 2.0 parts of t-butyl peroxy-2-ethylhexanoate and 0.3 part of laurylmercaptane was added at a constant rate in a 3 hour period. After maintaining the mixture warm warming for 30 minutes, a mixed solution of 1.0 part of t-butyl peroxy 2-ethylhexanoate and 5 parts of xylene was added at a constant rate in a 30 minute period and the reaction was continued at an elevated temperature for 2 hrs. and then allowed to cool (base resin G). After cooling, 17.6 parts of DC-3037 was added and the reaction was continued at 140° C. while removing the formed methanol out of the system. Sampling was made time by time. That is, the test sample was coated as thin film on glass plate and subjected to forced drying (130° C.×20 minutes). In the inspections made before and after drying, if the resins were thoroughly mixed together and clear coatings were observed, it was determined that this was the final point of the reaction. At this point, the reaction mixture was allowed to cool, mixed with 1.1 parts of HEEI, reacted at 80° C. for 1 hour and then allowed to cool. After cooling, the mixture was mixed with 34.2 parts of xylene to obtain an alkylenimine modified silicon acryl resin varnish 10. The characteristics of this varnish are shown in Table 1.

COMPARATIVE EXAMPLE 1

The base resin A stated in Example 1 was subjected to silicon modification as in Example 1. The thus-obtained varnish was named as varnish 11 and used for comparison's sake. The characteristics of this varnish are shown in Table 1.

COMPARATIVE EXAMPLE 2

The base resin C of Example 5 was subjected to a silicon modification as in Example 1 to obtain a silicon alkyd resin varnish 12, whose characteristics are shown in Table 1.

COMPARATIVE EXAMPLE 3

The base resin G of Example 10 was subjected to a silicon modification as in Example 10 to obtain silicon acryl resin varnish 13, whose characteristics are shown in Table 1.

COMPARATIVE EXAMPLE 4

The oil-free polyester resin varnish itself was used as comparative varnish A, whose characteristics are shown in Table 1.

TABLE 1

| | Example | | | | | | | | | | Comparative Example | | | |
|---|---|---|---|---|---|---|---|---|---|---|---|---|---|---|
| | 1 | 2 | 3 | 4 | 5 | 6 | 7 | 8 | 9 | 10 | 1 | 2 | 3 | 4 |
| Composition | | | | | | | | | | | | | | |
| hexa-hyd.phtha.anhyd. | 19.4 | 19.4 | 19.4 | 19.4 | 19.4 | 19.4 | 19.4 | 19.4 | 19.4 | ST 15.0 | 19.4 | 19.4 | ST 15.0 | 19.4 |
| isophthalic acid | | | | 83.1 | | | | 83.1 | 83.1 | *−¹42.2 | | | *−¹42.2 | |
| pentol | | | | | | | | 20.2 | 30.1 | *−²16.6 | | | *−²16.6 | |

TABLE 1-continued

|  | Example |  |  |  |  |  |  |  |  |  | Comparative Example |  |  |  |
|---|---|---|---|---|---|---|---|---|---|---|---|---|---|---|
|  | 1 | 2 | 3 | 4 | 5 | 6 | 7 | 8 | 9 | 10 | 1 | 2 | 3 | 4 |
| trimethylol propane | 22.6 | 22.6 | 22.6 | 32.9 | 46.3 | 22.6 | 46.7 | 62.5 | 122.4 | *−³23.2 | 22.6 | 46.3 | *−³23.2 | 22.6 |
| neopentylglycol | 26.5 | 26.5 | 26.5 |  | 14.7 | 26.5 |  |  |  | *−⁴3.0 | 26.5 | 14.7 | *−⁴3.0 | 26.5 |
| 1,6-hexanediol | 30.1 | 30.1 | 30.1 | 56.0 | 16.7 | 30.1 | 43.0 | 34.0 |  |  | 30.1 | 16.7 |  | 30.1 |
| coconut oil |  |  |  |  | 43.2 |  |  |  |  |  |  | 43.2 |  |  |
| isophthalic acid | 83.1 | 83.1 | 83.1 |  | 83.1 | 83.1 | 83.1 |  |  |  | 83.1 | 83.1 |  | 83.1 |
| trimellitic anhydride |  |  |  | 16.0 |  |  |  | 16.0 | 16.0 |  |  |  |  |  |
| OH value of base resin | 112 | 112 | 112 | 112 | 112 | 112 | 185 | 300 | 500 | 100 | 112 | 112 | 100 | 112 |
| acid value of base resin | 20 | 20 | 20 | 60 | 20 | 20 | 20 | 30 | 40 | 20 | 20 | 20 | 20 | 20 |
| Silicon modification |  |  |  |  |  |  |  |  |  |  |  |  |  |  |
| name of base resin | A | A | A | B | C | A | D | E | F | G | A | C | G |  |
| amount of resin(solid) | 85 | 85 | 85 | 85 | 85 | 85 | 95 | 55 | 40 | 85 | 85 | 85 | 85 |  |
| silicon resin | DC-3037 | DC-3037 | DC-3037 | DC-3037 | DC-3037 | KR-213 | DC-3037 | DC-3037 | DC-3037 | DC-3037 | DC-3037 | DC-3037 | DC-3037 |  |
| amount of silicon res. | 15 | 15 | 15 | 15 | 15 | 15 | 5 | 45 | 60 | 15 | 15 | 15 | 15 |  |
| Alkylenimine modification |  |  |  |  |  |  |  |  |  |  |  |  |  |  |
| alkylenimine | HEEI | HEEI | HEEI | HEEI | HEEI | ethylene imine | HEEI | HEEI | HEEI | HEEI |  |  |  |  |
| amount(in terms of resinous acid value to be consumed) | 3 | 6 | 10 | 40 | 6 | 6 | 1 | 6 | 6 | 6 |  |  |  |  |
| Varnish characteristics |  |  |  |  |  |  |  |  |  |  |  |  |  |  |
| non-volatile content % | 60.3 | 60.6 | 60.8 | 60.1 | 59.7 | 61.5 | 60.7 | 60.4 | 62.8 | 50.8 | 60.3 | 59.4 | 50.1 | 60.5 |
| varnish viscosity | R-S | S | S-T | X-Y | M | U | P-Q | O | K-L | Z | N-O | K | X-Y | S |
| resinous acid value | 15.0 | 13.2 | 10.6 | 17.1 | 13.5 | 12.9 | 18.5 | 11.8 | 11.3 | 12.9 | 17.5 | 16.9 | 17.3 | 20.2 |
| Name of varnish | 1 | 2 | 3 | 4 | 5 | 6 | 7 | 8 | 9 | 10 | 11 | 12 | 13 | A |

*−¹n-BMA
*−²LMA
*−³2 HEMA
*−⁴MAA

EXAMPLE 11

Using the alkyleneimine modified silicon polyester resin varnish 1 obtained in Example 1 and a melamine resin as a curing agent and following the prescription given in Table 2, a blue color coating composition was prepared. The thus-obtained composition was diluted with a mixed solvent of Solvesso 150 (Esso Standard Petrol, Co.)/xylene/butyl acetate/methylisobutyl ketone=50/20/15/15, to viscosity of 23 seconds (Ford cup #4, 20° C.). an SPC-1 dull steel plate previously treated with zinc phosphate bath and applied with an intercoat was spray-coated with the abovesaid diluted composition and after standing for a defined period of time, baked at 140° C. for 30 minutes. The thus-obtained coating was evaluated as hereinafter stated and the test results were shown in Table 2. Examples 12 to 18 and Comparative Examples 5 to 8 Using various resin varnishes obtained in Examples 3 to 10 and Comparative Examples 1 to 4 and following the prescriptions shown in Table 2, blue color coating compositions were prepared, coated and evaluated as in Example 11. The test results are shown in Table 2.

TABLE 2

|  | Example |  |  |  |  |  |  |  | Comp. 5 | Comp. 6 | Comp. 7 | Comp. 8 |
|---|---|---|---|---|---|---|---|---|---|---|---|---|
|  | 11 | 12 | 13 | 14 | 15 | 16 | 17 | 18 |  |  |  |  |
| Prescription |  |  |  |  |  |  |  |  |  |  |  |  |
| polyester resin | 1 35.0 | 3 35.0 | 4 35.0 |  | 6 35.0 | 7 35.0 | 9 35.0 |  | 11 35.0 |  |  | A 35.0 |
| alkyd resin |  |  |  | 5 35.0 |  |  |  |  |  | 12 35.0 |  |  |
| acrylic resin |  |  |  |  |  |  |  | 10 35.0 |  |  | 13 35.0 |  |
| melamine resin U-20SE*1 | 15.0 | 15.0 | 15.0 | 15.0 | 15.0 | 15.0 | 15.0 | 15.0 | 15.0 | 15.0 | 15.0 | 15.0 |
| titanium CR-95*2 | 45.0 | 45.0 | 45.0 | 45.0 | 45.0 | 45.0 | 45.0 | 45.0 | 45.0 | 45.0 | 45.0 | 45.0 |
| Fastgen blue NK*3 | 2.3 | 2.3 | 2.3 | 2.3 | 2.3 | 2.3 | 2.3 | 2.3 | 2.3 | 2.3 | 2.3 | 2.3 |
| xylene | 8.0 | 8.0 | 8.0 | 8.0 | 8.0 | 8.0 | 8.0 | 8.0 | 8.0 | 8.0 | 8.0 | 8.0 |
| Solvesso 100 *4 | 4.0 | 4.0 | 4.0 | 4.0 | 4.0 | 4.0 | 4.0 | 4.0 | 4.0 | 4.0 | 4.0 | 4.0 |
| n-butanol | 7.0 | 7.0 | 7.0 | 7.0 | 7.0 | 7.0 | 7.0 | 7.0 | 7.0 | 7.0 | 7.0 | 7.0 |
| Silicon KF-69*5 | 0.015 | 0.015 | 0.015 | 0.015 | 0.015 | 0.015 | 0.015 | 0.015 | 0.015 | 0.015 | 0.015 | 0.015 |
| Baking cond. °C. × 30 sec. | 140 | 140 | 140 | 140 | 140 | 140 | 140 | 140 | 140 | 140 | 140 | 140 |
| Film performance |  |  |  |  |  |  |  |  |  |  |  |  |
| appearance *6 | ○ | ◎ | ○ | ◎ | ○ | ○ | ○ | △ | ○ | ◎ | X | △ |
| 60° gloss | 93 | 97 | 98 | 97 | 96 | 95 | 95 | 93 | 91 | 94 | 88 | 90 |
| pencil hardness *7 | F-H | F-H | F-H | F | H | H | H-2H | H | F-H | F | H | F |
| weathering resis. ** | 88 | 89 | 85 | 78 | 81 | 70 | 86 | 90 | 82 | 65 | 84 | 25 |

TABLE 2-continued

|  | Example | | | | | | | | Comp. 5 | Comp. 6 | Comp. 7 | Comp. 8 |
| --- | --- | --- | --- | --- | --- | --- | --- | --- | --- | --- | --- | --- |
|  | 11 | 12 | 13 | 14 | 15 | 16 | 17 | 18 |  |  |  |  |
| recoatability *8 | ○ | ◎ | ◎ | ◎ | ◎ | ○ | ◎ | ◎ | X | X | X | Δ |

**gloss retention % after 1500 hours in Sunshine Weather-O-Meter Resin weight is expressed in terms of solid weight wherein
*¹melamine resin, manufactured by Mitsui Toatu Kagaku K.K. non-volatile content 60%
*²white pigment, manufactured by Ishihara Sangyo K.K.
*³blue pigment, manufactured by Dainihon Ink K.K.
*⁴mixed solvent, manufactured by Esso Standard Petrol. Co.
*⁵surface conditioner, manufactured by Shinetsu Kagaku K.K.
*⁶Finishing appearance was evaluated by visual observation on the following standard:
◎ very good
○ good
Δ fairly good
X no good
*⁷maximum hardness no to be injured by Mitsubishi Uni pencil
*⁸A coated plate was over-baked at 160° C. for 30 minutes and then applied by spraying with the respective coating composition and again baked at 120° C. for 30 minutes.(recoating of the same type of top-coat composition) Thereafter, the coating was cross-cut (2 mm width) by a razor and subjected to a peeling test with scotch tape. Number of peeled, 2 mm square pieces was determined and recoatability was evaluated according to the following criterion.
◎ no peeling (very good)
○ 1-10 (good)
Δ 11-30 (fairly good)
X 31 and more(no good)

EXAMPLES 19 TO 23 AND COMPARATIVE EXAMPLES 9 TO 12

Using various resin varnishes obtained in Examples 3, 5, 7, 9, 10 and Comparative Examples 1 to 4 and isocyanate compound as a curing agent and following the prescriptions given in Table 3, blue color coating compositions were prepared. After dilution, they were applied by spraying and the coatings were evaluated as in Example 11. The test results obtained are shown in Table 3. In either case, the recoatability is greatly improved without being affected adversely on the weathering resistance of the coating.

230° C., said temperature was increased at a constant speed over a period of 2 hours and the formed water was removed out of the system during said heating. When the temperature reached 230° C., the mixture was maintained at the same temperature until a resinous acid value of 1.0 was reached and then allowed to cool.

After cooling, 83.1 parts of isophthalic acid were added and again heated to 190° C. From 190° C. to 210° C., said temperature was raised at a constant rate in 3 hours, during which time the formed water was continuously removed out of the system. When the temperature reached 210° C., 3.2 parts of xylene was added and the reaction was switched to a condensation reaction in

TABLE 3

|  | Example | | | | | Comp. Example | | | |
| --- | --- | --- | --- | --- | --- | --- | --- | --- | --- |
|  | 19 | 20 | 21 | 22 | 23 | 9 | 10 | 11 | 12 |
| Prescription |  |  |  |  |  |  |  |  |  |
| polyester resin | 3 50.0 |  | 7 50.0 | 9 50.0 |  | 11 50.0 |  |  | A 50.0 |
| alkyd resin |  | 5 50.0 |  |  |  |  | 12 50.0 |  |  |
| acrylic resin |  |  |  |  | 10 50.0 |  |  | 13 50.0 |  |
| isocyanate compound *9 | 10.2 | 10.2 | 10.5 | 10.5 | 11.0 | 10.2 | 10.2 | 11.0 | 19.0 |
| Cellosolve acetate | 10.0 | 10.0 | 10.0 | 10.0 | 10.0 | 10.0 | 10.0 | 10.0 | 10.0 |
| Solvesso 100 | 26.0 | 26.0 | 26.0 | 26.0 | 26.0 | 26.0 | 26.0 | 26.0 | 26.0 |
| Titanium CR-95 | 70.0 | 70.0 | 70.0 | 70.0 | 70.0 | 70.0 | 70.0 | 70.0 | 70.0 |
| Fastgen blue NK | 3.5 | 3.5 | 3.5 | 3.5 | 3.5 | 3.5 | 3.5 | 3.5 | 3.5 |
| Modaflow *10 | 0.8 | 0.8 | 0.8 | 0.8 | 0.8 | 0.8 | 0.8 | 0.8 | 0.8 |
| Baking cond. °C. × 30 min. | 80 | 80 | 80 | 80 | 80 | 80 | 80 | 80 | 80 |
| Film performance appearance | ○ | ◎ | ○ | ○ | Δ | ○ | ◎ | X | Δ |
| 60° gloss | 95 | 96 | 95 | 93 | 90 | 90 | 92 | 87 | 88 |
| pencil hardness | F | HB-F | F-H | H | F-H | F | HB-F | F-H | HB-F |
| weathering resis.** | 90 | 81 | 85 | 93 | 95 | 87 | 76 | 88 | 42 |
| recoatability | ◎ | ◎ | ○ | ◎ | ◎ | Δ | X | X | Δ |

**gloss retention % after 2000 hours in Sunshine Weather-O-Meter
*9 Sumidul N, aliphatic polyisocyanate, non-volatile cont. 75%, manufactured by Sumitomo-Bayer Urethane
*10 surface conditioner, by Monsanto

SYNTHETIC EXAMPLE 1

Into a reaction vessel fitted with a heater, a stirrer, a reflux condenser a, water separator a, fractionating column and a thermometer, was placed 19.4 parts of hexahydro phthalic anhydride, 22.6 parts of trimethylol propane, 26.5 parts of neopentylglycol and 30.1 parts of 1,6-hexanediol and the mixture was heated. When the charged materials were melted and brought to the condition capable of being stirred, stirring was commenced and the temperature raised to 210° C. From 210° C. to the presence of a solvent. At the stage when the resinous acid value reaches 20.0, the mixture was allowed to cool and then mixed added with 75.9 parts of Cellosolve acetate to obtain an oil-free polyester resinous varnish A (ahereinafter called as base resin A).

Next, 28.7 parts of a reactive silicon resin DC-3037 (Dow Corning Co.) and 0.38 part of a TBT-100 (tetrabutyl tianate, condensation catalyst, manufactured by Nihon Soda K.K.) was added and the mixture was heated and stirred. The reaction was continued at 140° C. until the formed and recovered methanol quantity reached 75% of the theoretical amount (which is the methanol quantity when 100% of methoxy groups in the reactive silicon resin are reacted with the hydroxyl groups of the polyester resin), and then the mixture was allowed to cool. After cooling, 5.8 parts of xylene and 13.6 pats of Cellosolve acetate were added to obtain a silicon modified polyester resin varnish I. This varnish showed the characteristics of a non-volatile content of 60.3%; a varnish viscosity (Gardner's viscosity, 25° C.) of N—O; and a resinous acid value of 17.3.

SYNTHETIC EXAMPLE 2

Following the prescription shown in Table 4 and using a conventional method, coconut oil was subjected to an ester-exchange reaction and then a condensation reaction was carried out as in Synthetic Example 1 until the resinous acid value reached 20.0 (hereinafter called base resin B) After cooling, the base resin was then subjected to a silicon modification as in Synthetic Example 1 to obtain a silicon modified alkyd resin varnish II. The characteristics of this varnish are shown in Table 4.

SYNTHETIC EXAMPLE 3

According to the prescriptions shown in Table 4, similar condensations were carried out as in Synthetic Example 1 to a resinous acid value of 40.0, and then allowed to cool to obtain a base resin C. To the base resins a, reactive silicon resin DC-3037 was added so as to give a weight ratio of the base resin/silicon resin (solid)=40/60, and silicon modification was carried out as in Synthetic Example 1, to obtain a silicon modified polyester resin varnish III. The characteristics of this varnish are shown in Table 4.

SYNTHETIC EXAMPLE 4

Into a reaction vessel, was placed 45 parts of xylene and 50 parts of a Cellosolve acetate and the mixture was heated to 130° C. To this, a mixed solution of 15 parts of styrene (ST), 42.2 parts of n-butyl methacrylate (n-BMA), 16.6 parts of lauryl methacrylate (LMA), 23.2 parts of 2-hydroxyethyl methacrylate (2HEMA), 3.0 parts of methacrylic acid (MAA), 2.0 parts of t-butyl peroxy-2-ethylhexanoate and 0.3 part of laurylmercaptane was added at a constant rate a 3 hour period. After maintaining the mixture warm for 30 minutes, a mixed solution of 1.0 parts of t-butyl peroxy 2-ethylhexanoate and 5 parts of xylene was added at a constant rate in 30 minutes and the reaction was continued at an elevated temperature for 2 hrs. and then allowed to cool (base resin D). After cooling, 17.6 parts of DC-3037 was added and the reaction was continued at 140° C. while removing the formed methanol out of the system. Sampling was made time by time. That is, the test sample was coated as thin film on glass plate and subjected to forced drying (130° C.×20 minutes). In the inspections made before and after drying, if the resins were thoroughly mixed together and clear coatings were observed, it was determined that this was the final point of the reaction. At this point, the reaction mixture was allowed to cool. After cooling, the mixture was mixed with 34.2 parts of xylene to obtain a silicon modified acryl resin varnish IV. The characteristics of this varnish are shown in Table 4.

TABLE 4

| Synthetic Example | 1 | 2 | 3 | 4 |
| --- | --- | --- | --- | --- |
| Composition | | | | |
| hexahyd.phtha.anhyd. | 19.4 | 19.4 | 19.4 | ST 19.4 |
| | | | | n-BMA 42.2 |
| isophthalic acid | | | 83.1 | |
| pentol | | | 30.1 | LMA 16.6 |
| trimethylol propane | 22.6 | 46.3 | 122.4 | 2 HEMA 23.2 |
| neopentylglycol | 26.5 | 14.7 | | |
| 1,6-hexanediol | 30.1 | 16.7 | | MAA 3.0 |
| coconut oil | | 43.2 | | |
| isophthalic acid | 83.1 | 83.1 | | |
| trimellitic anhydride | | | 16.0 | |
| OH value of base resin | 112 | 112 | 500 | 100 |
| acid value of base resin | 20 | 20 | 40 | 20 |
| Silicon modification | | | | |
| name of base resin | A | B | C | D |
| amount of resin (solid) | 85 | 85 | 40 | 85 |
| silicon resin | DC-3037 | DC-3037 | DC-3037 | DC-3037 |
| amount of silicon res. | 15 | 15 | 60 | 15 |
| Varnish characteristics | | | | |
| non-volatile content % | 60.3 | 59.4 | 61.4 | 50.1 |
| varnish viscosity | N-O | K | J | X-Y |
| resinous acid value | 17.3 | 16.9 | 15.9 | 17.3 |
| Name of varnish | I | II | III | IV |

EXAMPLE 24

Using the silicon modified polyester resin varnish I obtained in Synthetic Example 1 and melamine resin as a curing agent and following the prescription given in Table 5, a blue color coating composition was prepared. To this composition, polyethylenimine (Epomine SP-110, trade mark of Nihon Shokubai Kagaku) was added in the weight ratio of silicon modified polyester resin/polyethylenimine=99/1 (in solid). The thus-obtained composition was diluted with a mixed solvent of Solvesso 150 (Esso Standard Petrol. Co.)/xylene/butyl acetate/methylisobutyl ketone=50/20/15/15, to a viscosity of 23 seconds (Ford cup #4, 20° C.).

An SPC-1 dull steel plate previously treated with a zinc phosphate bath and applied with an intercoat was spray-coated with the abovesaid diluted composition and after standing for a defined period of time, baked at 140° C. for 30 minutes. The thus-obtained coating was evaluated as hereinafter stated and the test results were shown in Table 5.

EXAMPLES 25 TO 30 AND COMPARATIVE EXAMPLES 13 TO 17

Using various silicon modified resin varnishes obtained in Synthetic Examples 1 to 4 and following the prescriptions shown in Table 5, blue color coating compositions were prepared, coated and evaluated as in Example 24. The test results are shown in Table 5.

TABLE 5

| Example | 24 | 25 | 26 | 27 | 28 | 29 | 30 | Comp. 13 | Comp. 14 | Comp. 15 | Comp. 16 | Comp. 17 |
| --- | --- | --- | --- | --- | --- | --- | --- | --- | --- | --- | --- | --- |
| silicon modif. polyester resin | I 42.0 | | III 42.0 | | I 42.0 | I 42.0 | I 50.0 | I 42.0 | | III 42.0 | | I 50.0 |
| silicon modif. alkyd resin | | II 42.0 | | | | | | | II 42.0 | | | |
| silicon modif. acryl resin | | | | IV 42.0 | | | | | | | III 42.0 | |

TABLE 5-continued

| Example | 24 | 25 | 26 | 27 | 28 | 29 | 30 | Comp. 13 | Comp. 14 | Comp. 15 | Comp. 16 | Comp. 17 |
|---|---|---|---|---|---|---|---|---|---|---|---|---|
| melamine resin U-20SE *1 | 18.0 | 18.0 | 18.0 | 18.0 | 18.0 | 18.0 |  | 18.0 | 18.0 | 18.0 | 18.0 |  |
| isocyanate compound Sumidul N *2 |  |  |  |  |  |  | 10.2 |  |  |  |  | 10.2 |
| titaanium CR-95 *3 | 70.0 | 70.0 | 70.0 | 70.0 | 70.0 | 70.0 | 70.0 | 70.0 | 70.0 | 70.0 | 70.0 | 70.0 |
| Fastgen blue NK *4 | 3.5 | 3.5 | 3.5 | 3.5 | 3.5 | 3.5 | 3.5 | 3.5 | 3.5 | 3.5 | 3.5 | 3.5 |
| Cellosolve acetate | 10.0 | 10.0 | 10.0 | 10.0 | 10.0 | 10.0 | 10.0 | 10.0 | 10.0 | 10.0 | 10.0 | 10.0 |
| Solvesso 100 | 26.0 | 26.0 | 26.0 | 26.0 | 26.0 | 26.0 | 26.0 | 26.0 | 26.0 | 26.0 | 26.0 | 26.0 |
| Modaflow *5 | 0.8 | 0.8 | 0.8 | 0.8 | 0.8 | 0.8 | 0.8 | 0.8 | 0.8 | 0.8 | 0.8 | 0.8 |
| Epomine *6 | 0.42 | 0.42 |  |  | 0.042 |  | 0.51 |  |  |  |  |  |
| Polyethylenimine 15 T *7 |  |  | 0.42 | 0.42 |  | 1.75 |  |  |  |  |  |  |
| solid weight ratio of silicon modif. resin/polyethylenimine | 99/1 | 99/1 | 99/1 | 99/1 | 99.9/0.1 | 96/4 | 99/1 |  |  |  |  |  |
| baking condition °C. × 30 min. | 140 | 140 | 140 | 140 | 140 | 140 | 80 | 140 | 140 | 140 | 140 | 80 |
| Film performance finish.appearance *8 | ○ | ◎ | ○ | ○ | ○ | ○ | ○ | ○ | ◎ | ○ | Δ | ○ |
| 60° gloss | 93 | 96 | 94 | 92 | 93 | 95 | 92 | 90 | 95 | 91 | 86 | 91 |
| pencil hardness *9 | F-H | F | H-2H | H | F-H | F | F-H | F-H | F | H-2H | H | F |
| weathering resistance** | 85 | 76 | 88 | 92 | 86 | 80 | 94 | 86 | 71 | 86 | 90 | 95 |
| recoatability *10 | ◎ | ◎ | ◎ | ◎ | ○ | ◎ | ◎ | × | × | × | × | Δ | resinous weights are solid weight.
**gloss retention % after 1500 hours in Sunshine Weather-O-Meter
wherein
*1 Melamine resin, manufactured by Mitsui Toatu Kagaku K.K. non-volatile content 60%
*2 aliphatic polyisocyanate. non-volatile 75%. manufactured by Sumitomo Bayer Urethane
*3 white pigment, manufactured by Ishihara Sangyo K.K.
*4 blue pigment, manufactured by Dainihon Ink K.K.
*5 surface conditioner, manufactured by Monsanto
*6 Polyethyleneimine compound, molecular weight about 1000 manufactured by Nihon Shokubai Kagaku Kogyo
*7 Polyethyleneimine compound, viscosity 1000-2000 cps, manufactured by Sogo Yakko K.K.
*8 Finishing appearance was evaluated by visual observation on the following standard:
◎ very good
○ good
Δ fairly good
× no good
*9 maximum hardness which is not determinedly affected by a Mitsubishi Uni pencil
*10 A coated plate was over-baked at 160° C. for 30 minutes and then applied by spraying with the respective coating composition and again baked at 120° C. for 30 minutes. (recoating of the same type of top-coat composition) Thereafter, the coating was cross-cut (2 mm width) by a razor and subjected to a peeling test with scotch tape. The number of peeled, 2 mm square pieces was determined and recoatability was evaluated according to the following criterion.
◎ no peeling (very good)
○ 1-10 (good)
Δ 11-30 (fairly good)
× 31 and more (no good)

From these test results, it is clear that in either case of using melamine and isocyanate curing agents, the recoatability is greatly improved by the addition of a polyalkylenimine without adversely effecting the weathering resistance of the coating.

What is claimed is:

1. A resinous composition for coating use obtained by the reaction of a base resin having both hydroxyl and carboxyl groups which is selected from the group consisting of a polyester resin and an alkyd resin, with an organopolysiloxane resin of the formula:

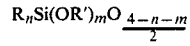

wherein R is a monovalent organic group attached to Si through C—Si bonding; R' is hydrogen, a $C_1$ to $C_{20}$ alkyl or an aryl group; and n and m each represents a real number of 4 or less, providing that the sum of n and m is 4 or less, and having a number average molecular weight of about 500 to 2000, and with an alkylenimine compound having at least one $C_2$ to $C_3$ alkylenimine ring.

2. The composition according to claim 1, wherein the organopolysiloxane resin is reacted with the base resin in the weight ratio of 3-80 parts to 97-20 parts.

3. The composition according to claim 1, wherein the alkylenimine compound is reacted with the base resin in an amount corresponding to a resinous acid value of 0.1 to 50.

4. The composition according to claim 1, wherein 3 to 80 parts of the organopolysiloxane resin is reacted with 97 to 20 parts of the base resin and the alkylenimine compound is then reacted in an amount of $2 \times 10^{-4}$M to $1 \times 10^{-1}$M weight percent of the base resin, wherein $$M = \frac{\text{molecular weight of alkylenimine}}{\text{number of alkylenimine groups contained in a molecule of the alkyleneimine compound}}$$

* * * * *